(12) United States Patent
Tokuda

(10) Patent No.: US 6,229,535 B1
(45) Date of Patent: May 8, 2001

(54) FILE ACCEPTANCE DISPLAY APPARATUS, FILE ACCEPTANCE DISPLAY METHOD, AND STORAGE MEDIUM THAT RECORDS PROGRAM FOR EXECUTING FILE ACCEPTANCE DISPLAY METHOD

(75) Inventor: Katsumi Tokuda, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/216,605

(22) Filed: Dec. 17, 1998

(30) Foreign Application Priority Data

Dec. 19, 1997 (JP) .................................................... 9-350980

(51) Int. Cl.$^7$ ....................................................... G06F 3/14
(52) U.S. Cl. ............................ 345/339; 345/329; 707/10; 707/509; 709/201; 709/217; 709/225
(58) Field of Search .................................. 709/201, 217, 709/225; 707/10, 509, 513; 345/329, 339

(56) References Cited

U.S. PATENT DOCUMENTS

| | | | |
|---|---|---|---|
| 5,649,186 | * | 7/1997 | Ferguson ................................ 707/10 |
| 5,742,768 | * | 4/1998 | Gennaro et al. ..................... 395/200 |
| 5,802,530 | * | 9/1998 | Van Hoff ............................. 707/513 |
| 5,826,242 | * | 10/1998 | Montulli ............................... 705/27 |
| 5,870,559 | * | 10/1998 | Leshem et al. ........................ 707/10 |

* cited by examiner

Primary Examiner—Raymond J. Bayerl
Assistant Examiner—Thomas T. Nguyen
(74) Attorney, Agent, or Firm—Price and Gess

(57) ABSTRACT

A hypertext storage unit stores a hypertext list that shows the total sizes of the hypertexts that a hypertext acceptance unit is to be accept and the amount of data in the hypertexts that the hypertext acceptance unit has accepted. In a hyperlink information storage unit, a hyperlink information table of character strings that are now displayed is written by a hypertext analysis unit. A hypertext acceptance ratio calculation unit calculates the acceptance ratio of a hypertext. A hypertext display control unit displays the acceptance ratio, adding the acceptance ratio to a character string.

15 Claims, 12 Drawing Sheets

FIG. 2

```
[base.htm]
<HTML>
<HEAD><TITLE>
X X BROADCASTING CO., LTD.
</TITLE></HEAD>
<BODY>
<CENTER>
X X BROADCASTING CO., LTD.
</CENTER>
<UL>
<LI><A HREF="banguml.htm">PROGRAM</A>
<LI><A HREF="news.htm">NEWS</A>
<LI><A HREF="event.htm">EVENT</A>
<LI><A HREF="knowhow.htm">KNOWHOW</A>
</UL>
</BODY>
(c) X X Broadcasting CO., LTD.
</HTML>
```

FIG. 3

[bangumi.htm]
<HTML>
<HEAD><TITLE>
NANAMI'S TOP TEN OF THIS WEEK
</TITLE></HEAD>
<BODY>
<CENTER>
NANAMI'S TOP TEN OF THIS WEEK
</CENTER>
<UL>
<LI><A HREF="bangumi1.htm">PROFILE OF YUMIKO</A>
<LI><A HREF="bangumi2.htm">LYRICS</A>
<LI><A HREF="bangumi3.htm">ALBUM</A>
</UL>
</BODY>
(c) ×× Broadcasting Co., Ltd.
</HTML>

FIG. 6

HYPERTEXT LIST 601

| FILE NAME | TOTAL SIZE | ACCEPTED SIZE |
|---|---|---|
| base.htm | 1239 | 1239 |
| bangumi.htm | 246 | 246 |
| news.htm | 12340 | 1234 |
| event.htm | 980 | 490 |
| knowhow.htm | 1 | 0 |
| news1.htm | 1 | 0 |
| news2.htm | 1 | 0 |
| bangumi1.htm | 1 | 0 |
| bangumi2.htm | 1 | 0 |
| bangumi3.htm | 1 | 0 |
| event1.htm | 1 | 0 |
| event2.htm | 1 | 0 |
| event3.htm | 1 | 0 |
| ⋮ | ⋮ | ⋮ |

FIG. 7

HYPERLINK INFORMATION LIST 701

| PROCESSING COMPLETION FLAG | COORDINATES (X COORDINATE, Y COORDINATE) | LINK CHARACTER STRING | HYPERTEXT FILE NAME |
|---|---|---|---|
| OFF | 0,4 | PROGRAM | bangumi.htm |
| OFF | 0,6 | NEWS | news.htm |
| OFF | 0,8 | EVENT | event.htm |
| OFF | 0,10 | KNOWHOW | knowhow.htm |

FIG. 12

| ACCEPTANCE RATIO | COLOR |
|---|---|
| 100% | RED 1 |
| EQUAL TO OR MORE THAN 80% TO LESS THAN 100% | RED 2 |
| EQUAL TO OR MORE THAN 60% TO LESS THAN 80% | RED 3 |
| EQUAL TO OR MORE THAN 40% TO LESS THAN 60% | RED 4 |
| EQUAL TO OR MORE THAN 20% TO LESS THAN 40% | RED 5 |
| LESS THAN 20% | WHITE |

FILE ACCEPTANCE DISPLAY APPARATUS, FILE ACCEPTANCE DISPLAY METHOD, AND STORAGE MEDIUM THAT RECORDS PROGRAM FOR EXECUTING FILE ACCEPTANCE DISPLAY METHOD

This application is based on an application No. 9-350980 filed in Japan, the content of which is hereby incorporated by reference.

BACKGROUND OF THE INVENTION (1) Field of the Invention

The present invention relates to a file acceptance display apparatus that accepts a group of files including character strings in each of which the identifier of the link destination file to which the character string is related is embedded, the file acceptance display apparatus that displays one of the accepted files.

(2) Description of the Related Art

An automatic information distribution system that distributes electronic news, programs, and the like using computer networks, character broadcasting, digital satellite broadcasting has been recently available. In such an automatic information distribution system, information is transmitted in a hypertext format file. As a result, it is possible to refer to the news and a program in another file with facility by tracing the link woven in the hyperlink. A conventional file acceptance display apparatus is described in Japanese Laid-Open Patent Application No. 9-182038. According to the conventional invention, the file of a program guide in a hypertext format is multiplexed with the video signal of television broadcasting when transmitted, and is decoded in a television set.

The conventional file acceptance display apparatus, however, displays a character string in which the identifier of the link destination file in a hypertext format is embedded in one display style regardless of whether the link destination file has been received. Note that when not completely received, a link destination file is not displayed. As a result, even when the user selects a character string, the link destination file of the character string is not displayed and the user selection is a time-wasting operation.

SUMMARY OF THE INVENTION

It is accordingly an object of the present invention to provide a file acceptance display apparatus that prevents the user from selecting a character string that is linked to a hypertext file which has not been completely received.

Another object of the present invention is to provide a file acceptance display method that prevents the user from selecting a character string that is linked to a hypertext format file that has not been completely received.

A further object of the present invention is to provide a recording medium that records the program for realizing the method that prevents the user from selecting a character string that is linked to a hypertext format file that has not been completely received.

The above-mentioned first object is achieved by a file acceptance display apparatus that accepts a plurality of files transmitted and including display elements in which identifiers of link destination files are embedded, the file acceptance display apparatus that displays an accepted file on a display screen, accepts selection of a display element by a user, and has a link destination file corresponding to the selected display element displayed in place of the accepted file on the display screen, the file acceptance display apparatus may include: an acceptance unit for accepting the plurality of files that are transmitted; a file storage unit for storing the plurality of files that the acceptance unit has accepted; and a control unit for changing a display style of and/or a display related to a display element included in the accepted file displayed on the display screen according to a present acceptance condition of a link destination file corresponding to the display element.

It is possible for the file acceptance display apparatus to change the display style of and/or the display related to a character string that is linked to another file according to the acceptance condition of the link destination file.

The first object may be also achieved by the file acceptance display apparatus, wherein the acceptance unit includes: a size information acceptance unit for accepting a piece of size information that shows a size of a file for each of the plurality of files before the acceptance unit accepts the plurality of files; and a file size storage unit for storing a piece of size information for each of the plurality of files, and the control unit includes: an identifier extraction unit for extracting each pair of a display element and a corresponding identifier of a link destination file that are included in an accepted file on the display screen; a display element storage unit for storing each pair of a display element and a corresponding identifier; an acceptance ratio calculation unit for calculating an acceptance ratio of a link destination file that is identified by an extracted identifier that has been stored in the display element storage unit from an amount of data in the link destination file and a piece of size information on the link destination file for each extracted display element, wherein the acceptance unit accepts each link destination file part by part, and when the acceptance unit accepts a part of a given link destination file, the file storage unit adds the accepted part to previously accepted parts of the given link destination file and stores the added parts together; and a display control unit for changing a display style of and/or a display related to an extracted display element on the display screen according to an acceptance ratio that has been calculated by the acceptance ratio calculation unit.

It is possible for the file acceptance display apparatus to notify the user of the acceptance ratio of the link destination file to which a character string included in the file that is now displayed is linked. As a result, the user is prevented from selecting a character string that is linked to a link destination file that may not be displayed.

The first object may be also achieved by the file acceptance display apparatus, wherein the acceptance ratio calculation unit continues calculating an acceptance ratio until the acceptance ratio becomes 100%, and the control unit further includes an audio output control unit for having sound emitted, whenever notified by the acceptance ratio calculation unit that an acceptance ratio becomes 100%, the sound indicating that selection of an extracted display element is possible.

It is possible for the file acceptance display apparatus to notify the user of a character string that may be selected for displaying the corresponding link destination file.

The first object may be also achieved by the file acceptance display apparatus, wherein the display control unit include a percentage display control unit for displaying numbers representing an acceptance ratio next to a corresponding extracted display element on the display screen.

It is possible for the file acceptance display apparatus to notify the user of the acceptance ratio of a link destination file with a numerical value.

The first object may be also achieved by the file acceptance display apparatus, wherein the acceptance ratio calculation unit includes: a timer; and an interval acceptance ratio calculation unit for calculating an acceptance ratio every predetermined interval timed by the timer.

It is possible for the file acceptance display apparatus to notify the user of the acceptance ratio of a link destination file every predetermined interval.

The first object may be also achieved by the file acceptance display apparatus that may further comprise a selection operation unit for allowing, when notified by the acceptance ratio calculation unit that an acceptance ratio becomes 100%, the user to select a corresponding extracted display element.

It is possible for the file acceptance display apparatus to completely prevent the user from selecting a character string the corresponding link destination file of which may not be displayed.

The first object may be also achieved by the file acceptance display apparatus, wherein the plurality of files are described in HTML, and the identifier extraction unit extracts each pair of a display element that is placed between tags <A> and </A> and a corresponding identifier that is written inside the tag <A>.

It is possible for the file acceptance display apparatus to accept and display a file that is linked to another file.

The first object may be also achieved by the file acceptance display apparatus, wherein the display control unit includes: a correspondence list storage unit for storing a list in which each one of groups into which acceptance ratios 0% to 100% are divided by a predetermined range corresponds to one of different colors, wherein the different colors are different hues, different chromatic colors, or colors that differ in brightness; and a corresponding color display control unit for displaying an extracted display element in a color corresponding to an acceptance ratio of a corresponding link destination file according to the list.

It is possible for the file acceptance display apparatus to quickly notify the user of the acceptance ratio of a link destination file.

The first object may be also achieved by the file acceptance display apparatus, wherein the acceptance ratio calculation unit continues calculating an acceptance ratio until the acceptance ratio becomes 100%, and the display control unit includes a reverse display control unit for displaying the display screen in reverse video for a moment when notified by the acceptance ratio calculation unit that an acceptance ratio becomes 100%.

It is possible for the file acceptance display apparatus to notify the user of a character string that may be selected for displaying the corresponding link destination file.

The above-mentioned second object is achieved by a file acceptance display method that accepts a plurality of files transmitted and including display elements in which identifiers of link destination files are embedded, the file acceptance display method that displays an accepted file on a display screen, accepts selection of a display element by a user, and has a link destination file corresponding to the selected display element displayed in place of the accepted file on the display screen, the file acceptance display method may include: a file size acceptance storage step for accepting and storing sizes of the plurality of transmitted files; an acceptance step for accepting the plurality of files that are transmitted; a file storage step for storing the plurality of files that has been accepted at the acceptance step; an acceptance condition detection step for detecting an acceptance condition of a link destination file using amount of data in the link destination file and a size of the link destination file for each display element in an accepted file; and a display style change step for changing a display style of and/or a display related to a display element included in an accepted file displayed on the display screen according to a present acceptance condition of a link destination file corresponding to the display element.

It is possible for the file acceptance display method to change the display style of and/or the display related to a character string that is linked to another file according to the acceptance condition of the link destination file.

The above-mentioned third object is achieved by a computer-readable storage medium storing a program used by a file acceptance display apparatus that accepts a plurality of files transmitted and including display elements in which identifiers of link destination files are embedded, the file acceptance display apparatus that displays an accepted file on a display screen, accepts selection of a display element by a user, and has a link destination file corresponding to the selected display element displayed in place of the accepted file on the display screen, the program may include: a file size acceptance storage step for accepting and storing sizes of the plurality of transmitted files; an acceptance step for accepting the plurality of files that are transmitted; a file storage step for storing the plurality of files that has been accepted at the acceptance step; an acceptance condition detection step for detecting an acceptance condition of a link destination file using amount of data in the link destination file and a size of the link destination file for each display element in an accepted file; and a display style change step for changing a display style of and/or a display related to a display element included in an accepted file displayed on the display screen according to a present acceptance condition of a link destination file corresponding to the display element.

It is possible for the computer-readable storage medium to have a file acceptance display apparatus without a function of changing the display style of and/or the display related to a character string that is linked to another file according to the acceptance condition of the link destination file realize the function.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 2 shows the content of a file stored in the hypertext storage unit in the file acceptance display apparatus in the first embodiment;

FIG. 3 shows the content of a file stored in the hypertext storage unit in the file acceptance display apparatus in the first embodiment;

FIG. 6 is a hypertext list stored in the hypertext storage unit in the file acceptance display apparatus in the first embodiment;

FIG. 7 is a hyperlink information table stored in the hyperlink information storage unit in the file acceptance display apparatus in the first embodiment;

FIG. 12 is a table stored in the hypertext display control unit in the file acceptance display apparatus as the modification of the second embodiment in which the acceptance ratios correspond to character colors.

DESCRIPTION OF THE PREFERRED EMBODIMENTS

The preferred embodiments of the file acceptance display apparatus according to the present invention will be described with reference to figures.

FIRST EMBODIMENT

Figure 1:
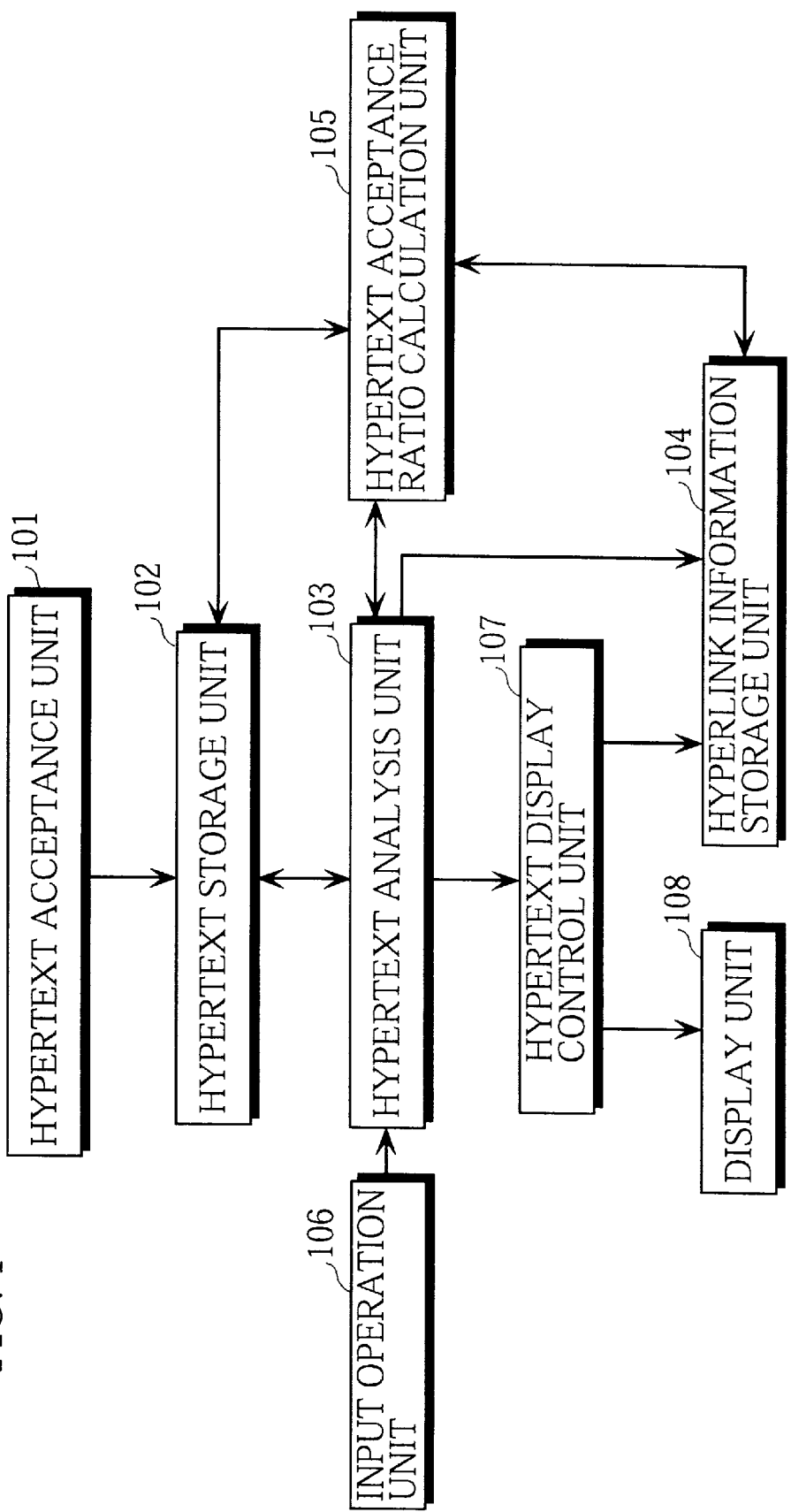
FIG. 1 shows a construction of a file acceptance display apparatus in the first embodiment according to the present invention.

FIG. 1 shows a construction of a file acceptance display apparatus in the first embodiment according to the present invention.

The file acceptance display apparatus includes a hypertext acceptance unit 101, a hypertext storage unit 102, a hypertext analysis unit 103, a hyperlink information storage unit 104, a hypertext acceptance ratio calculation unit 105, an input operation unit 106, a hypertext display control unit 107, and a display unit 108.

When accepting a file in a hypertext format (called a "hypertext" hereinafter in this specification) transmitted from a television or radio station by a broadcast wave and a hypertext transmitted via a Local Area Network (LAN) or a telephone line, the hypertext acceptance unit 101 has the hypertext storage unit 102 store the accepted hypertext. The hypertext acceptance unit 101 has the hypertext storage unit 102 distinguish among the stored hypertexts.

When accepting the file name and the total size of a hypertext before the hypertext transmission from a television or radio station, the hypertext acceptance unit 101 writes the file name and the total size in the hypertext list in the hypertext storage unit 102. Here, if the file name has been recorded and the default value "1" has been recorded as the total size, the total size is overwritten over the default value "1".

In addition, the hypertext acceptance unit 101 rites the size of the part of the hypertext that has been stored in the hypertext storage unit 102 in the hypertext list, relating the accepted part size to the file name. Here, if part of the hypertext has been accepted, the hypertext acceptance unit 101 adds the size of the newly accepted part of the hypertext to the size of the part that has been written in the hypertext list, and overwrites the sum over the written size.

The hypertext storage unit 102 is composed of a Random Access Memory (RAM) or another storage apparatus, stores the hypertexts that the hypertext acceptance unit 101 has accepted, and distinguishes among the accepted hypertexts. In addition, the hypertext storage unit 102 stores the hypertext list written by the hypertext analysis unit 103 and the hypertext acceptance unit 101.

FIG. 2 shows a hypertext 201 stored in the hypertext storage unit 102. The hypertext 201 is described in the Hyper Text Markup Language (HTML) and is identified by a file name 202 "base.htm". The hypertext 201 is a hypertext that is first displayed when the input operation unit 106 accepts the instruction to display a hypertext.

The hypertext 201 includes a title 203 "XX Broadcasting Co., Ltd.", a character string 204 "Program" that is put between tags <A> and </A>, and character strings 205 "News", 206 "Event", and 207 "Knowhow". For the character strings 204 to 207, the file names of the linked hypertext "bangumi.htm", "news.htm", "event.htm", and "knowhow.htm" are embedded in the tags <A>, respectively.

Figure 4:
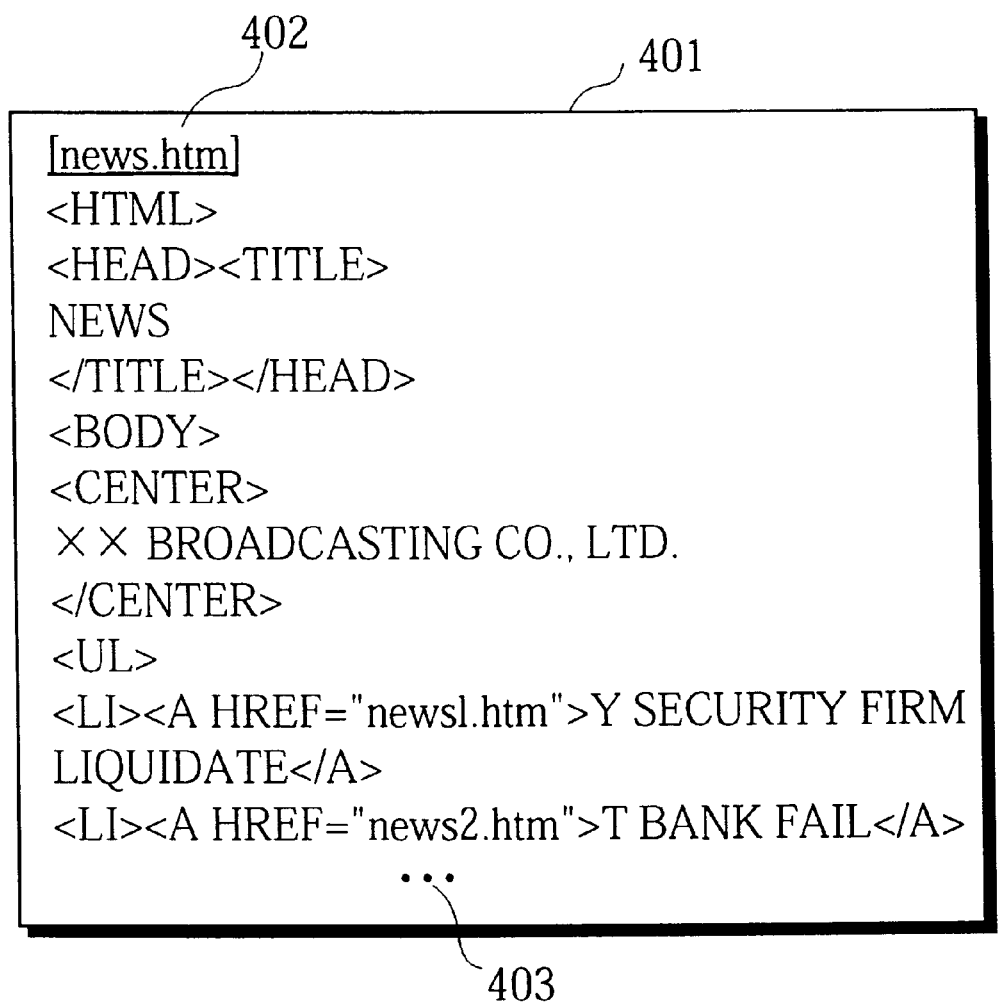
FIG. 4 shows the content of a file stored in the hypertext storage unit in the file acceptance display apparatus in the first embodiment.
Figure 5:
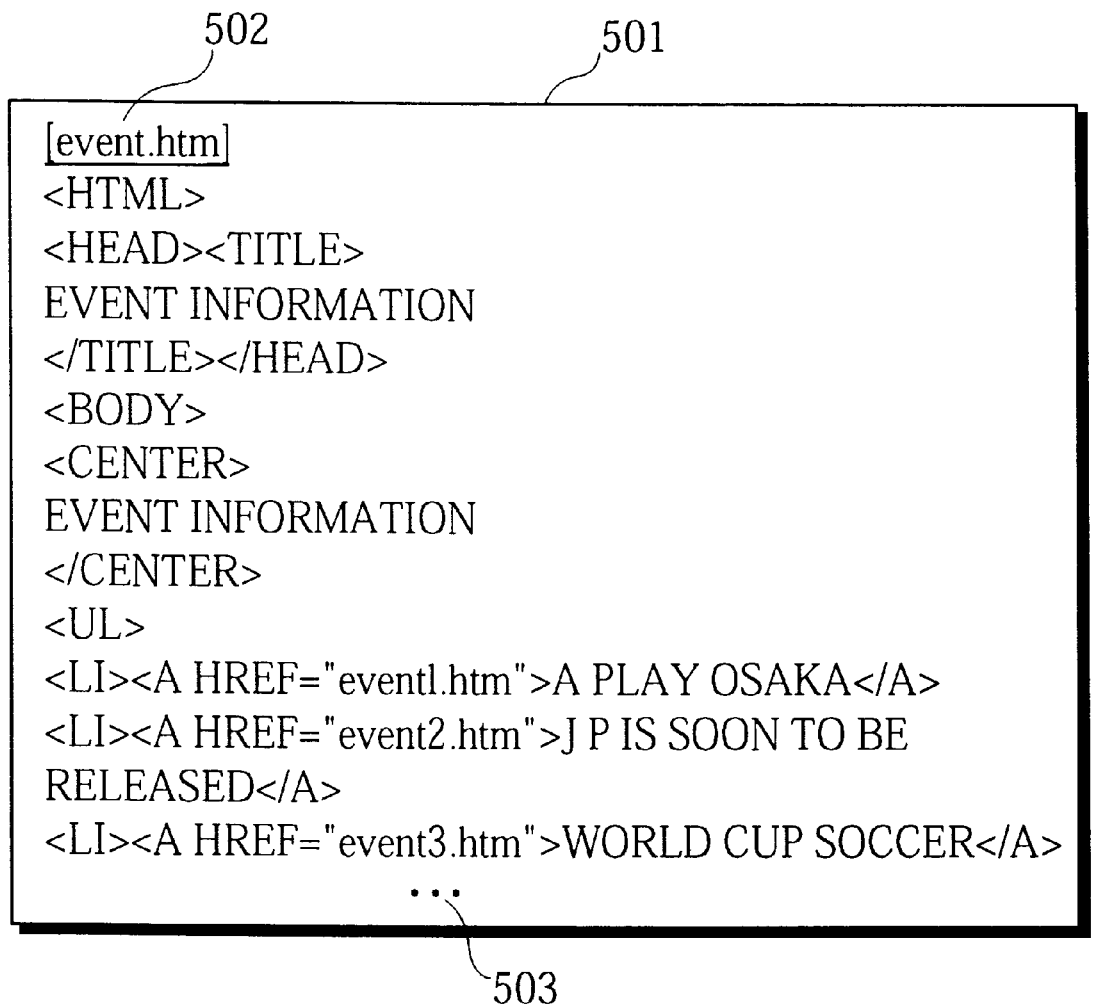
FIG. 5 shows the content of a file stored in the hypertext storage unit in the file acceptance display apparatus in the first embodiment.

FIGS. 3, 4, and 5 show hypertexts that are stored in the hypertext storage unit 102 at some point in time.

FIG. 3 shows a hypertext 301, to which the character string 204 "Program" in the hypertext 201 is linked. The hypertext 301 is identified by a file name 302 "bangumi.htm". The hypertext 301 also includes character strings 303 "Profile of Yumiko", 304 "Lyrics", and 305 "Album", each of which are linked to another file.

FIG. 4 shows a hypertext 401, to which the character string 205 "News" is linked. The hypertext 401 is identified by a file name 402 "news.htm", and is now being accepted as shown by dots 403 " . . . ". Not the entire content of the hypertext 401 has been recorded in the hypertext storage unit 102.

FIG. 5 shows a hypertext 501, to which the character string 206 "Event" is linked. The hypertext 501 is identified by a file name 502 "event.htm", and not the entire content has been recorded in the hypertext storage unit 102 as shown by dots 503 " . . . ".

FIG. 6 shows a hypertext list 601 stored in the hypertext storage unit 102. The hypertext list 601 includes a file name column 602, a total size column 603, an accepted size column 604. A "total size" shows the total size of a hypertext. An "accepted size" shows the size of the accepted part of a hypertext that is now stored in the hypertext storage unit 102, i.e., the size of the part of a hypertext that has been accepted.

When accepted by the hypertext acceptance unit 101 before the content, a file name 605 "base.htm" and a corresponding total size "1239", which is shown in the total size column 603 in the hypertext list 601, are written by the hypertext acceptance unit 101. The other total sizes in the hypertext list 601, including the total size corresponding to a file name 606 "bangumi.htm", are written or overwritten by the hypertext acceptance unit 101. This is because the hypertext analysis unit 103 may have interpreted the hypertext that is identified by the file name 202 "base.htm", and written the file names of the link destination hypertexts, the default values "1" of the corresponding total sizes, and the default values "0" of the corresponding accepted sizes in the hypertext list 601 before the hypertext acceptance unit 101 accepts the link destination hypertext file names and the corresponding total sizes.

A file name 607 "knowhow.htm", the file names shown under the file name 607, and the total and accepted sizes corresponding to the file names including the file name 607 have been written by the hypertext analysis unit 103. Neither the contents nor the total sizes of the hypertexts have been accepted.

An accepted size "0" is written in the accepted size column 604 when the hypertext analysis unit 103 writes a default value "0" or when the hypertext acceptance unit 101 accepts the file name and total size of a hypertext. After that, every time the hypertext acceptance unit 101 accepts and records part of the content of the hypertext, the size of the newly accepted part of the content is added to the accepted size written in the accepted size column 604, and the sum is overwritten over the written accepted size.

FIG. 6 shows the hypertext list 601 when the contents of the hypertexts shown in FIGS. 2 to 5 are stored in the hypertext storage unit 102.

The hypertext analysis unit 103 interprets the hypertexts stored in the hypertext storage unit 102. When finding that a character string related to another file is included in the hypertext, the hypertext analysis unit 103 writes the file name, the total size, and the accepted size of the link destination hypertext in the hypertext list 601 in the hypertext storage unit 102. Here, if recorded, the file name is not written. For the total size and the accepted size, default values "1" and "0" are written, respectively.

When accepting the instruction to display the hypertext from the input operation unit 106 and finding that no hypertext is displayed on the display unit 108, the hypertext analysis unit 103 reads the hypertext corresponding to the default file name 202 "base.htm" from the hypertext storage unit 102, interprets the read hypertext, expands the hypertext to bit map data, and notifies the hypertext display control unit 107 of the bit map data. On the other hand, when notified of the choice of a character string that is shown in the hypertext on the display unit 108 and is linked to another file from the input operation unit 106, the hypertext analysis unit 103 reads the hypertext identified by the file name that is attached to the selected character string from the hypertext storage unit 102, interprets the hypertext, expands the hypertext to bit map data, and notifies the hypertext display control unit 107 of the bit map data.

When notifying the hypertext display control unit 107 of the bit map data of the hypertext that is to be displayed, the hypertext analysis unit 103 has the hyperlink information storage unit 104 store the hyperlink information on the linked character string included in the hypertext and instructs the hypertext acceptance ratio calculation unit 105 to calculate the acceptance ratio.

When notified of the character string and the acceptance ratio from the hypertext acceptance ratio calculation unit 105, the hypertext analysis unit 103 reads the coordinates in the hyperlink information list that has been written in the hyperlink information storage unit 104 and notifies the hypertext display control unit 107 of the coordinates, the notified character string, and the notified acceptance ratio.

The hyperlink information storage unit 104 is composed of a RAM or another storage apparatus, and stores the hyperlink information list. FIG. 7 shows a hyperlink information list 701. The hyperlink information list 701 shows the information on the linked character strings (called a "link character string" hereinafter in this specification), in each of which the file name of the link destination hypertext is embedded, included in the hypertext that is displayed on the display unit 108. In the hyperlink information list 701, information is written by the hypertext analysis unit 103.

The hyperlink information list 701 includes a processing completion flag column 702, a coordinate column 703, a link character string column 704, and a hypertext file name column 705.

The hyperlink information list 701 is stored in the hyperlink information storage unit 104 when the hypertext 201, which is identified by the file name "base.htm" shown in FIG. 2, is displayed on the display unit 108. In the link character string column 704, the link character strings 204 to 207 in the hypertext 201 are recorded. In the coordinate column 703, the X and Y coordinates of the link character strings 204 to 207 for selection are recorded. In the hypertext file name column 705, the file names of the hypertexts to which the link character strings 204 to 207 are linked are recorded. In the processing completion flag column 702, the processing completion flag is "ON" every time the hypertext acceptance ratio calculation unit 105 calculates the acceptance ratio of the hypertext identified by a file name recorded in the hypertext file name column 705, and the processing completion flag is "OFF" before the hypertext acceptance ratio calculation unit 105 re-calculates a acceptance ratio. Here, when the hyperlink information list 701 is recorded, the processing completion flag is "OFF" by default.

More specifically, when instructed to calculate the acceptance ratio of a hypertext by the hypertext analysis unit 103, the hypertext acceptance ratio calculation unit 105 reads a link character string for which the processing completion flag is "OFF" in the processing completion flag column 702 and the corresponding file name in the hyperlink information list 701 that is stored in the hyperlink information storage unit 104, and reads the total and accepted sizes corresponding to the read file name from the hypertext list 601 that is stored in the hypertext storage unit 102. The hypertext acceptance ratio calculation unit 105 divides the read accepted size by the read total size, and multiplies the result by 100 to calculates the acceptance ratio. The hypertext acceptance ratio calculation unit 105 notifies the hypertext analysis unit 103 of the calculated acceptance ratio and the read link character string, and sets the processing completion flag in the hyperlink information storage unit 104 as "ON". The hypertext acceptance ratio calculation unit 105 repeats the processing until all of the processing completion flags are "ON".

In addition, when not all of the acceptance ratios of the hypertexts that are identified by the file names are 100%, the hypertext acceptance ratio calculation unit 105 sets all of the processing completion flags as "OFF", and re-calculates the acceptance ratios.

The input operation unit 106 accepts the instruction from the user to display a hypertext, and notifies the hypertext analysis unit 103 of the instruction. When accepted the selection of a link character string, the input operation unit 106 notifies the hypertext analysis unit 103 of the selected link character string.

When notified of the bit map data of the hypertext from the hypertext analysis unit 103, the hypertext display control unit 107 has the display unit 108 display the notified bit map data. When notified of the link character string, the coordinates, and the acceptance ratio from the hypertext analysis unit 103, the hypertext display control unit 107 has the display unit 108 display the notified acceptance ratio as the numerical superscript on the notified link character string. Here, the display position of the acceptance ratio is determined in consideration of the number of the characters in the link character string. Here, the notification of an acceptance ratio is repeated until the acceptance ratio becomes 100%. As a result, the display of the acceptance ratio is renewed every time the acceptance ratio is notified. As a matter of course, when the acceptance ratio does not change, the display does not change either.

The display unit 108 is composed of a Cathode-Ray Tube (CRT) RAM, a liquid-crystal display, or another display, and displays the content of a hypertext under the control of the hypertext display control unit 107.

Figure 8:
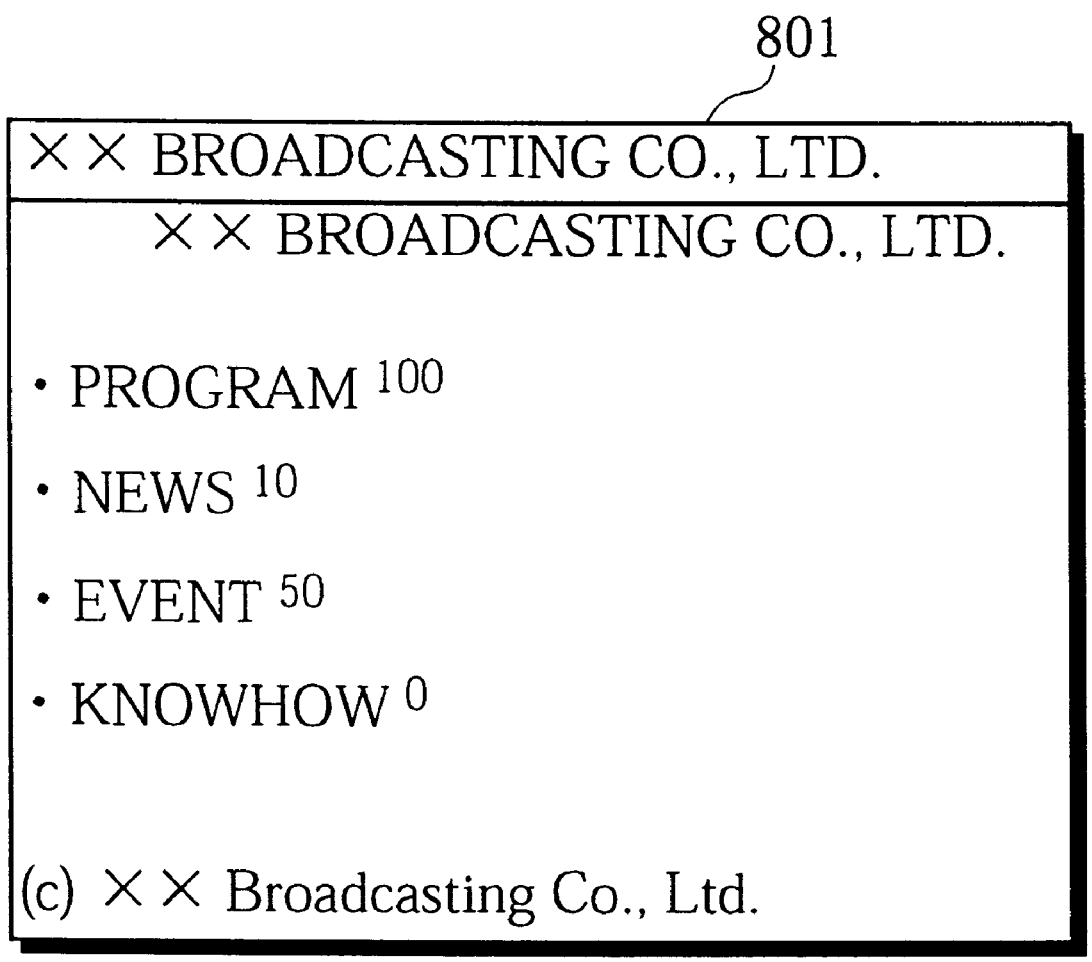
FIG. 8 shows a display screen displayed on the display unit in the file acceptance display apparatus in the first embodiment.
Figure 9:
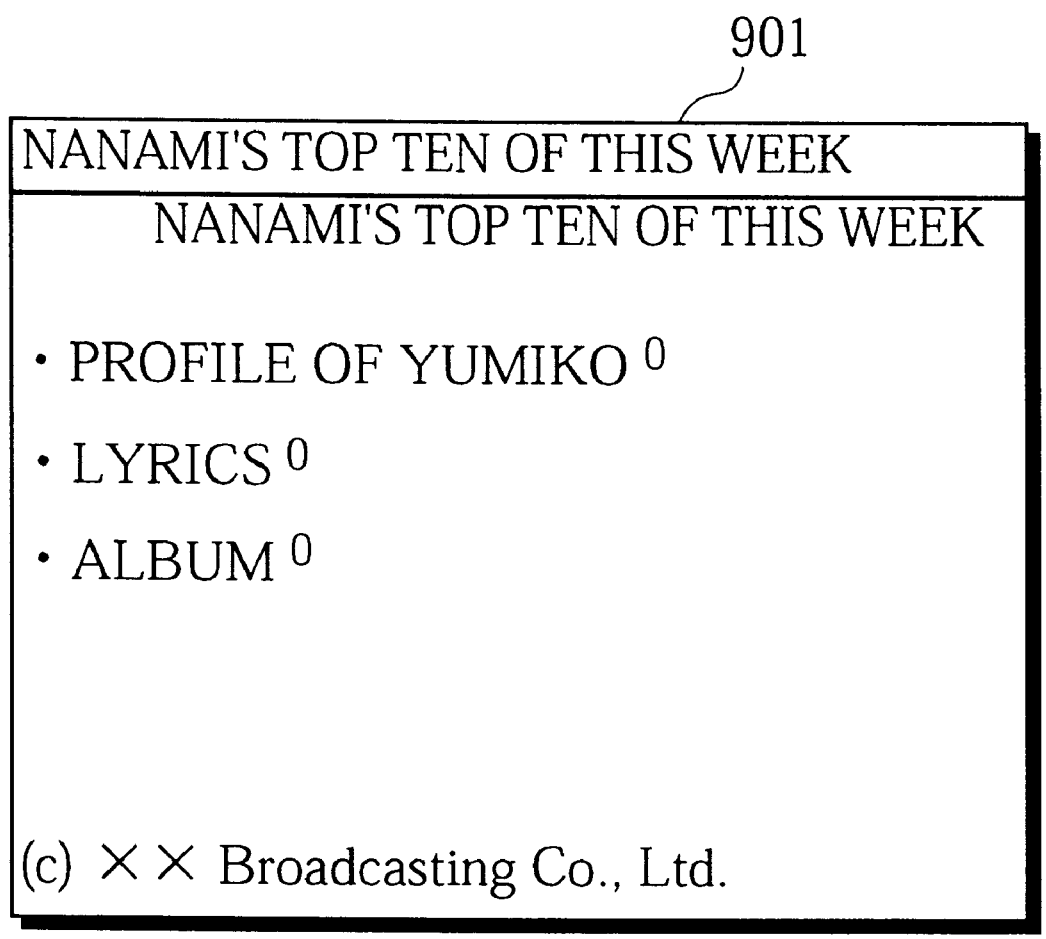
FIG. 9 shows a display screen displayed on the display unit in the file acceptance display apparatus in the first embodiment.

FIG. 8 shows a display screen 801 on which the hypertext whose file name is "base.htm" is displayed. The display screen 801 is displayed when the hypertexts 201 to 501, shown in FIGS. 2 to 5, are stored in the hypertext storage unit 102. The numerical superscript "100" of the link character string "Program" shows the acceptance ratio of the hypertext whose file name is "bangumi.htm" in the hypertext list 601 in FIG. 6, i.e., "(the accepted size/the total size)×100=(246/246)×100=100", and the numerical superscript "10" of the link character string "Program" shows the acceptance ratio of the hypertext whose file name is "news.htm", i.e., "(the accepted size/the total size)×100= (1234/12340)×100=10".

The display screen 801 shows that only the link character string "Program" may be selected by the user. This is because when the acceptance ratio represented by the numerical superscript on a link character string is lower than "100", the link destination hypertext has not been completely accepted and may not be displayed.

Suppose that the input operation unit 106 accepts the user's selection of the link character string "Program" when the display screen 801 is displayed on the display unit 108, a display screen 901 is displayed. The display screen 901 corresponds to the hypertext 301 whose file name is "bangumi.htm". The acceptance ratios shown by the numerical superscripts of the link character strings on the display screen 901 are all "0". As a result, the user easily notices that no link destination hypertext is displayed even if the user selects one of the link characters.

Figure 10:
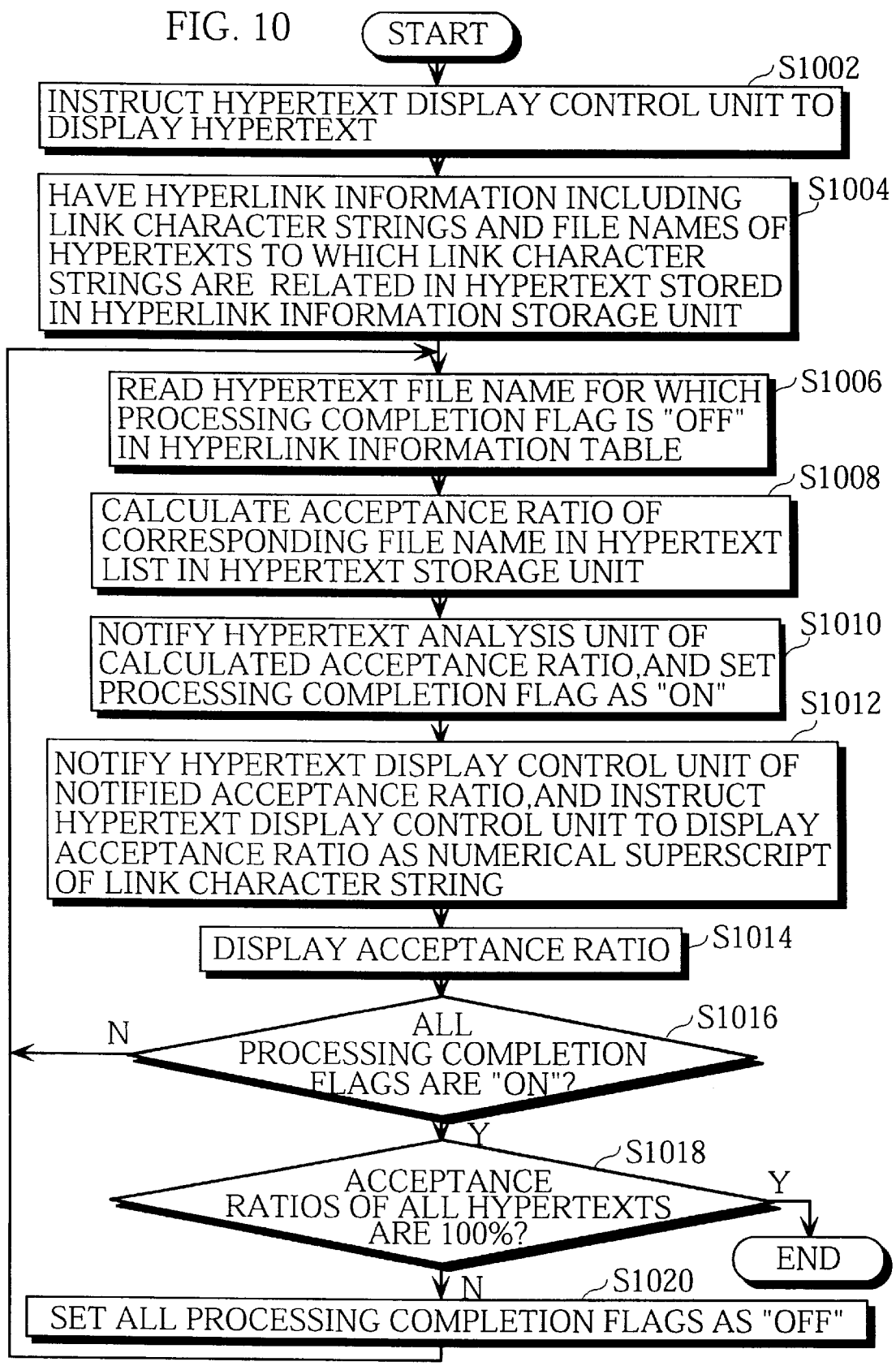
FIG. 10 is a flowchart illustrating the processing in displaying the acceptance ratio in the first embodiment.

The processing of the acceptance ratio display, which is the main operation of the file acceptance display apparatus in the present embodiment, will be explained with reference to the flowchart shown in FIG. 10.

When notified of the instruction to display a hypertext from the user via the input operation unit 106, the hypertext analysis unit 103 notifies the hypertext display control unit 107 of the hypertext that is expanded to a bit map data, and instructs the hypertext display control unit 107 to display the bit map data (Step S1002). At Step S1004, the hypertext analysis unit 103 writes the hyperlink information, i.e., the link character strings and the files names to which the link character strings are linked, included in the hypertext in the hyperlink information table in the hyperlink information storage unit 104.

The hypertext acceptance ratio calculation unit 105 reads the hypertext file name for which the processing completion flag is "OFF" in the hyperlink information table (Step S1006), and calculates the acceptance ratio of the corresponding file name in the hypertext list stored in the hypertext storage unit 102 (Step S1008). The hypertext acceptance ratio calculation unit 105 notifies the hypertext analysis unit 103 of the calculated acceptance ratio, and sets the processing completion flag as "ON" (Step S1010).

The hypertext analysis unit 103 notifies the hypertext display control unit 107 of the notified acceptance ratio, and instructs the hypertext display control unit 107 to display the acceptance ratio as the numerical superscript on the link character string (Step 1012).

The hypertext display control unit 107 displays the acceptance ratio as the numerical superscript on the link character string of the hypertext on the display screen on the display unit 108 (Step S1014). As a result, the user may select only the link character string whose acceptance ratio is "100".

The hypertext acceptance ratio calculation unit 105 judges whether all of the processing completion flags in the hyperlink information table are "ON" (S1016). When it is not the case, the process returns to Step S1006, and when it is the case, the hypertext acceptance ratio calculation unit 105 judges whether the acceptance ratios of all of the hypertexts are 100% (Step S1018). When it is the case, the process is completed, and when it is not the case, the hypertext acceptance ratio calculation unit 105 sets all of the processing completion flags as "OFF" (Step S1020) and the process returns to Step S1006.

Here, in the present embodiment, when notified of the link character string and the acceptance ratio from the hypertext acceptance ratio calculation unit 105, the hypertext analysis unit 103 may notify the input operation unit 106 of a link character string whose acceptance ratio is 100% as a character string that may be selected.

The input operation unit 106 reads the coordinates for selecting the notified link character string from the hyperlink information list 701 that is stored in the hyperlink information storage unit 104, accepts the selection of the character string corresponding to the coordinates, and notifies the hypertext analysis unit 103 of the character string. In other words, the input operation unit 106 has only the character string of which the hypertext analysis unit 103 has notified as a character string that may be selected treated as hot spots.

As has been described above, it is possible for the user not to select the link character string the link destination hypertext of which has not been completely accepted, i.e., to select only the link character string the link destination hypertext of which may be displayed.

SECOND EMBODIMENT

Figure 11:
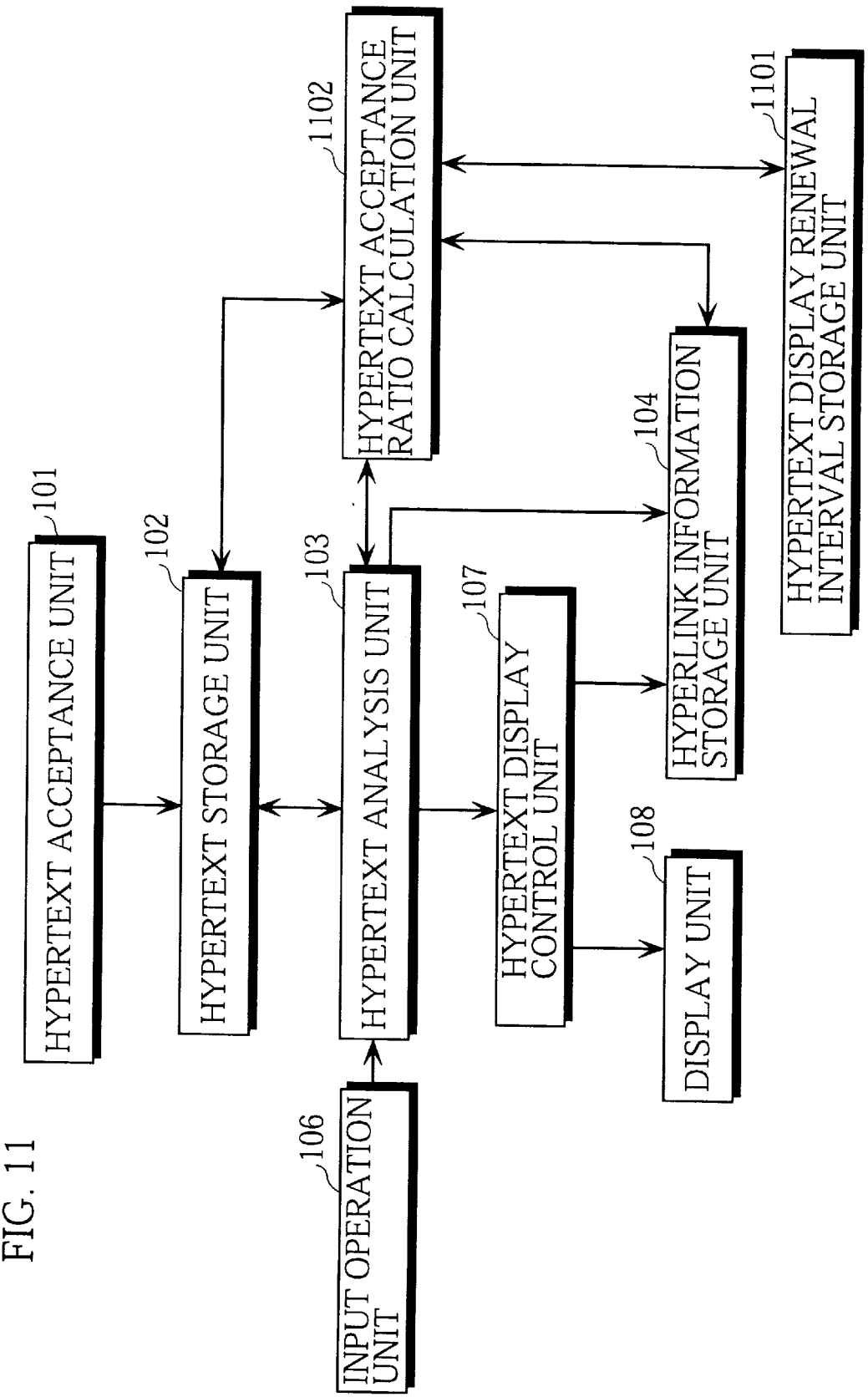
FIG. 11 shows a construction of a file acceptance display apparatus in the second embodiment according to the present invention.

FIG. 11 shows the construction of the file acceptance display apparatus in the second embodiment according to the present invention. The file acceptance display apparatus in the second embodiment differs from that in the first embodiment only in including a hypertext display renewal interval storage unit 1101. As a result, the components that have the same functions have the same reference numbers and will not been explained, i.e., only the components that have the different functions will be explained below.

The hypertext display renewal interval storage unit 1101 stores the interval between the renewals of the display of the acceptance ratio that is shown as the numerical superscript on a link character string in advance. A display renewal interval "T" is set as "1 second", for instance.

A hypertext acceptance ratio calculation unit 1102 has almost the same construction as the hypertext acceptance ratio calculation unit 105, but differs from the hypertext acceptance ratio calculation unit 105 in waiting the time "T", which has stored in the hypertext display renewal interval storage unit 1101, when re-calculating the acceptance ratios of the hypertexts to which the link character strings included in the hypertext displayed on the display unit 108 are linked when finding that not all the acceptance ratios are 100%.

More specifically, the hypertext acceptance ratio calculation unit 1102 includes a clock, sets all of the processing completion flags as "OFF", and reads the time "T", which has been stored in the hypertext display renewal interval storage unit 1101. After a lapse of the time "T", the hypertext acceptance ratio calculation unit 1102 reads a file name for which the processing completion flag is "OFF" in the hyperlink information table in the hyperlink information storage unit 104, and calculates the acceptance ratio as in the first embodiment.

The processing by the file acceptance display apparatus in the second embodiment that differs from that by the file acceptance display apparatus in the first embodiment will be described below. After the Step S1020 in the flowchart in FIG. 10, the hypertext acceptance ratio calculation unit 1102 waits the time "T", and the process returns to Step S1006.

While the acceptance ratio of a link destination hypertext of a link character string is shown as the numerical superscript on the link character string in the first and second embodiments, it is possible to show the acceptance ratio by changing the color of the link character string as a modification of the embodiments.

More specifically, the hypertext display control unit 107 stores the list shown in FIG. 12 in which acceptance ratios correspond to colors of link character string. When notified of an acceptance ratio via the hypertext analysis unit 103, the hypertext display control unit 107 changes the color of the corresponding link character string to the color corresponding to the notified acceptance ratio.

Here, among the colors "red 1" to "red 5", the color "red 1" has the highest chroma and the color "red 5" has the lowest chroma.

Of course, the color is not limited to red. In this manner, the user instantly judges whether a link character string may be selected without the numerical value of the acceptance ratio.

In addition, it is possible to connect an audio output control unit and an audio output unit (both of which are not shown in FIGS. 10 and 11) to the hypertext analysis unit 103 and to notify the audio output control unit of a hypertext acceptance ratio 100%. Meanwhile, it is possible for the audio output control unit have the audio output unit emit a beep as a warning to notice the user of a link character string that may be selected.

Further, it is possible for the hypertext display control unit 107 to display the display screen on the display unit 108 in reverse video for a moment when a hypertext acceptance ratio 100% is notified via the hypertext analysis unit 103. As a result, the user may be notified of a link character string that may be selected.

While the hypertext display control unit 107 shows the acceptance ratios of the link character strings as the numerical superscripts of the link character strings in the first and second embodiments, it is possible for the hypertext display control unit 107 to show the acceptance ratios using a bar chart in a window on the display screen in which the acceptance ratios correspond to the link character strings, for instance.

It is also possible to apply the present invention to a file acceptance display apparatus that does not have the functions of the components of the first and second embodiments shown in FIGS. 1 and 11 by recording the functions on a computer-readable storage medium.

Note that while the accepted hypertexts are described in the HTML in the first and second embodiments, the hypertexts are not limited to files described in the HTML according to the present invention. The hypertexts may be described in the Extensible Markup language (XML), the format used in the Frequency Modulation (FM) teletext broadcasting, or the like.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A file acceptance display apparatus that accepts a plurality of files transmitted and including display elements in which identifiers of link destination files are embedded, the file acceptance display apparatus that displays an accepted file on a display screen, accepts selection of a display element by a user, and has a link destination file corresponding to the selected display element displayed in place of the accepted file on the display screen, the file acceptance display apparatus comprising:
acceptance means for accepting the plurality of files that are transmitted;
file storage means for storing the plurality of files that the acceptance means has accepted; and
control means for changing a display style of and/or a display related to a display element included in the accepted file displayed on the display screen according to a present acceptance condition of a link destination file corresponding to the display element.

2. The file acceptance display apparatus according to claim 1, wherein
the acceptance means includes:
a size information acceptance unit for accepting a piece of size information that shows a size of a file for each of the plurality of files before the acceptance means accepts the plurality of files; and
a file size storage unit for storing a piece of size information for each of the plurality of files, and
the control means includes:
an identifier extraction unit for extracting each pair of a display element and a corresponding identifier of a link destination file that are included in an accepted file on the display screen;
a display element storage unit for storing each pair of a display element and a corresponding identifier;
an acceptance ratio calculation unit for calculating an acceptance ratio of a link destination file that is identified by an extracted identifier that has been stored in the display element storage unit from an amount of data in the link destination file and a piece of size information on the link destination file for each extracted display element, wherein the acceptance means accepts each link destination file part by part, and when the acceptance means accepts a part of a given link destination file, the file storage means adds the accepted part to previously accepted parts of the given link destination file and stores the added parts together; and
a display control unit for changing a display style of and/or a display related to an extracted display element on the display screen according to an acceptance ratio that has been calculated by the acceptance ratio calculation unit.

3. The file acceptance display apparatus according to claim 2, wherein
the acceptance ratio calculation unit continues calculating an acceptance ratio until the acceptance ratio becomes 100%, and
the control means further includes an audio output control unit for having sound emitted, whenever notified by the acceptance ratio calculation unit that an acceptance ratio becomes 100%, the sound indicating that selection of an extracted display element is possible.

4. The file acceptance display apparatus according to claim 3, wherein the display control unit includes a percentage display control unit for displaying numbers representing an acceptance ratio next to a corresponding extracted display element on the display screen.

5. The file acceptance display apparatus according to claim 4, wherein the acceptance ratio calculation unit includes:
  a timer; and
  an interval acceptance ratio calculation unit for calculating an acceptance ratio every predetermined interval timed by the timer.

6. The file acceptance display apparatus according to claim 5 further comprising selection operation means for allowing, when notified by the acceptance ratio calculation unit that an acceptance ratio becomes 100%, the user to select a corresponding extracted display element.

7. The file acceptance display apparatus according to claim 6, wherein
  the plurality of files are described in HTML, and
  the identifier extraction unit extracts each pair of a display element that is placed between tags <A> and </A> and a corresponding identifier that is written inside the tag <A>.

8. The file acceptance display apparatus according to claim 3, wherein the display control unit includes:
  a correspondence list storage unit for storing a list in which each one of groups into which acceptance ratios 0% to 100% are divided by a predetermined range corresponds to one of different colors, wherein the different colors are different hues, different chromatic colors, or colors that differ in brightness; and
  a corresponding color display control unit for displaying an extracted display element in a color corresponding to an acceptance ratio of a corresponding link destination file according to the list.

9. The file acceptance display apparatus according to claim 2, wherein
  the acceptance ratio calculation unit continues calculating an acceptance ratio until the acceptance ratio becomes 100%, and the display control unit includes a reverse display control unit for displaying the display screen in reverse video for a moment when notified by the acceptance ratio calculation unit that an acceptance ratio becomes 100%.

10. The file acceptance display apparatus according to claim 2, wherein the display control unit includes a percentage display control unit for displaying numbers representing an acceptance ratio next to a corresponding extracted display element on the display screen.

11. The file acceptance display apparatus according to claim 2, wherein the acceptance ratio calculation unit includes:
  a timer; and
  an interval acceptance ratio calculation unit for calculating an acceptance ratio every predetermined interval timed by the timer.

12. The file acceptance display apparatus according to claim 2, wherein the display control unit includes:
  a correspondence list storage unit for storing a list in which each one of groups into which acceptance ratios 0% to 100% are divided by a predetermined range corresponds to one of different colors, wherein the different colors are different hues, different chromatic colors, or colors that differ in brightness; and
  a corresponding color display control unit for displaying an extracted display element in a color corresponding to an acceptance ratio of a corresponding link destination file according to the list.

13. The file acceptance display apparatus according to claim 1, wherein
  the plurality of files are described in HTML, and
  the identifier extraction unit extracts each pair of a display element that is placed between tags <A> and </A> and a corresponding identifier that is written inside the tag <A>.

14. A file acceptance display method that accepts a plurality of files transmitted and including display elements in which identifiers of link destination files are embedded, the file acceptance display method that displays an accepted file on a display screen, accepts selection of a display element by a user, and has a link destination file corresponding to the selected display element displayed in place of the accepted file on the display screen,
  the file acceptance display method comprising:
    a file size acceptance storage step for accepting and storing sizes of the plurality of transmitted files;
    an acceptance step for accepting the plurality of files that are transmitted;
    a file storage step for storing the plurality of files that has been accepted at the acceptance step;
    an acceptance condition detection step for detecting an acceptance condition of a link destination file using amount of data in the link destination file and a size of the link destination file for each display element in an accepted file; and
    a display style change step for changing a display style of and/or a display related to a display element included in an accepted file displayed on the display screen according to a present acceptance condition of a link destination file corresponding to the display element.

15. A computer-readable storage medium storing a program used by a file acceptance display apparatus that accepts a plurality of files transmitted and including display elements in which identifiers of link destination files are embedded, the file acceptance display apparatus that displays an accepted file on a display screen, accepts selection of a display element by a user, and has a link destination file corresponding to the selected display element displayed in place of the accepted file on the display screen,
  the program comprising:
    a file size acceptance storage step for accepting and storing sizes of the plurality of transmitted files;
    an acceptance step for accepting the plurality of files that are transmitted;
    a file storage step for storing the plurality of files that has been accepted at the acceptance step;
    an acceptance condition detection step for detecting an acceptance condition of a link destination file using amount of data in the link destination file and a size of the link destination file for each display element in an accepted file; and
    a display style change step for changing a display style of and/or a display related to a display element included in an accepted file displayed on the display screen according to a present acceptance condition of a link destination file corresponding to the display element.

* * * * *